March 22, 1960     L. H. LAMOURIA     2,929,184
METHOD FOR HARVESTING GRAPES AND THE LIKE
Original Filed Aug. 24, 1956     11 Sheets-Sheet 1

INVENTOR.
LLOYD H. LAMOURIA
BY
ATTORNEY

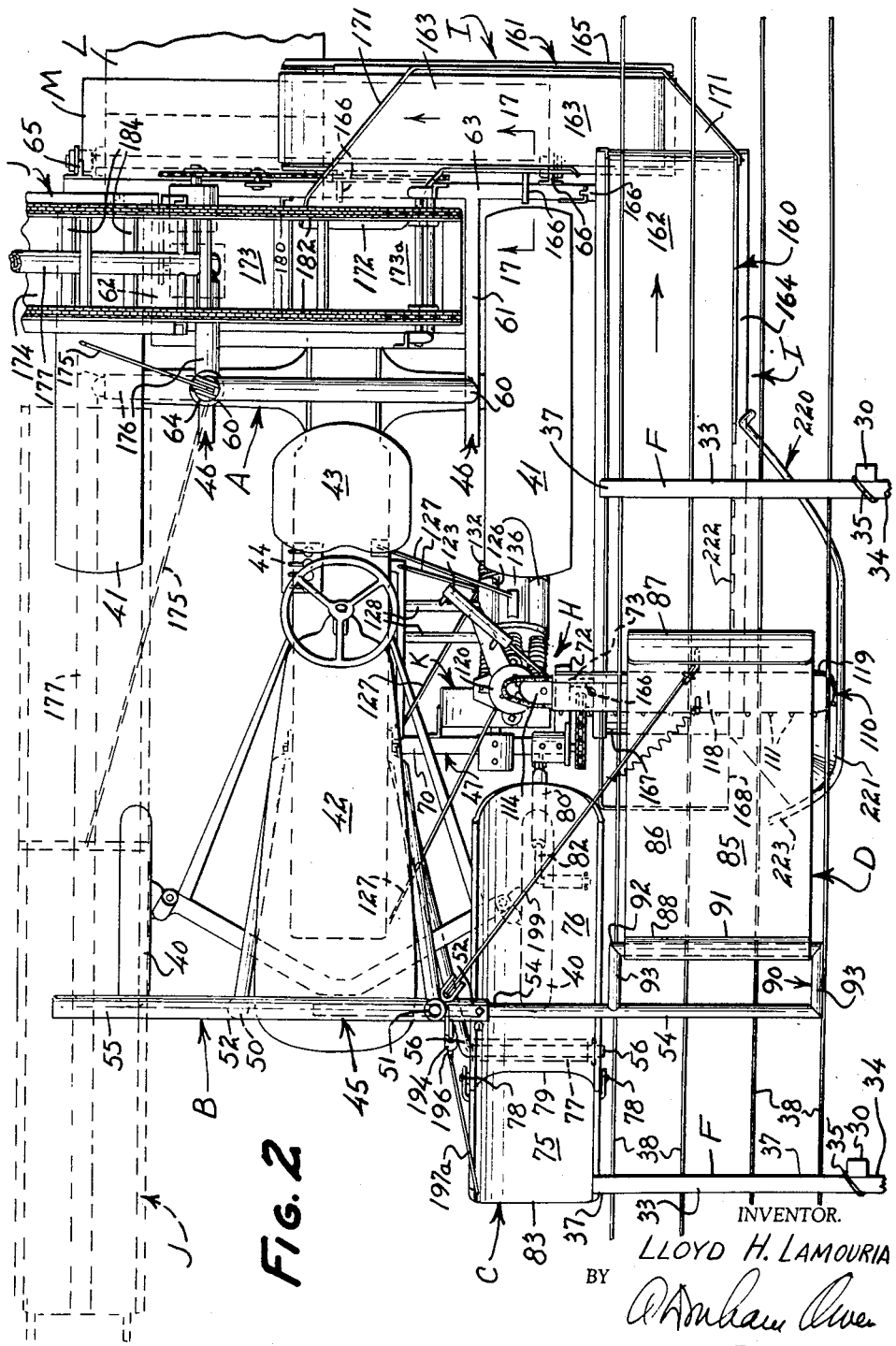

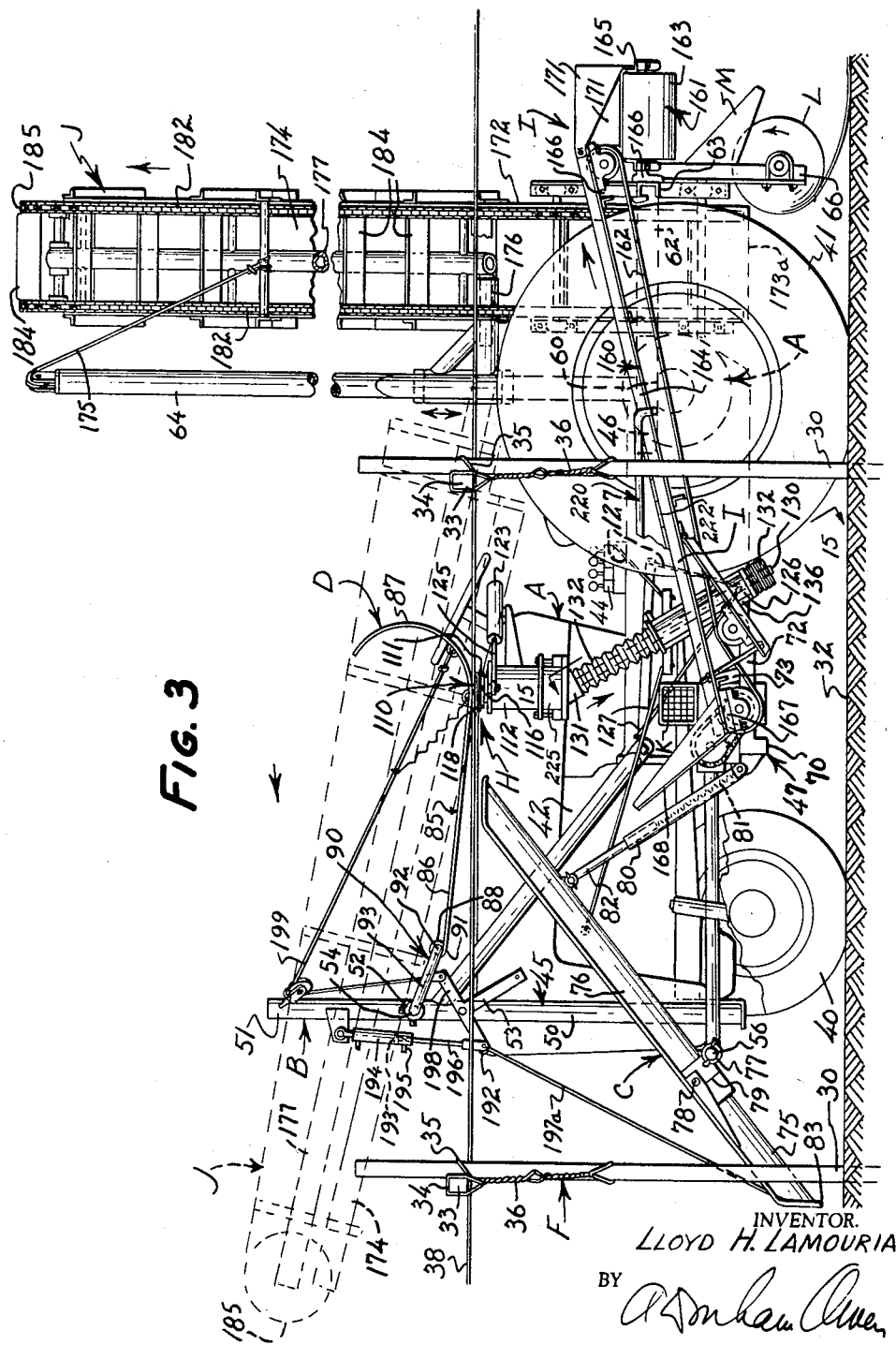

March 22, 1960 L. H. LAMOURIA 2,929,184
METHOD FOR HARVESTING GRAPES AND THE LIKE
Original Filed Aug. 24, 1956 11 Sheets-Sheet 4
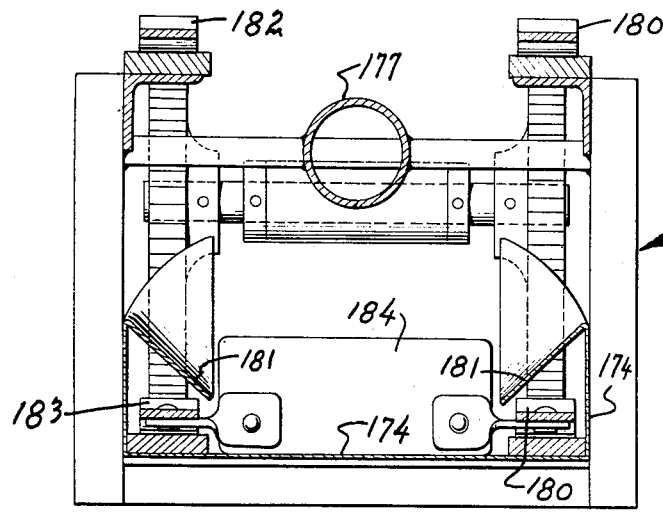
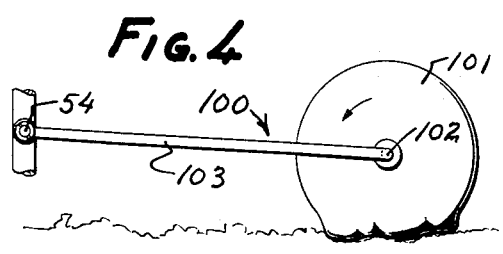
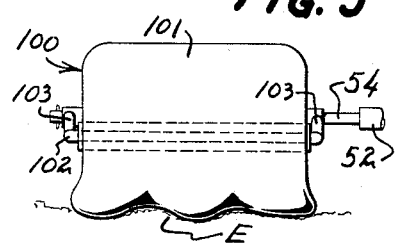
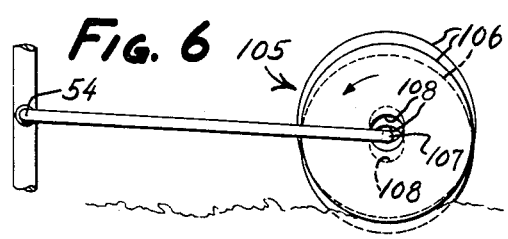
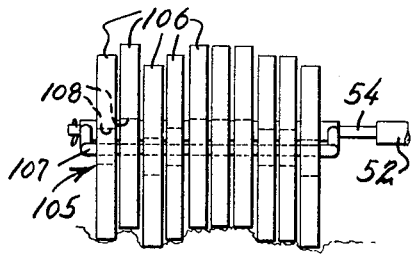
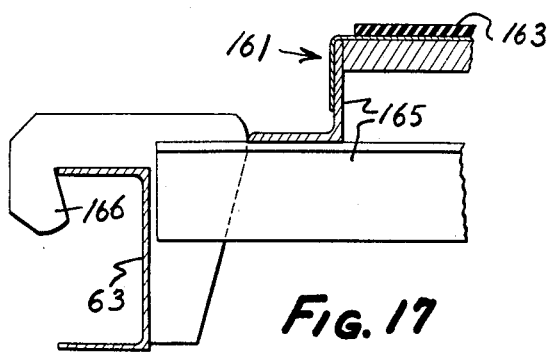
INVENTOR.
LLOYD H. LAMOURIA
BY
ATTORNEY March 22, 1960 L. H. LAMOURIA 2,929,184
METHOD FOR HARVESTING GRAPES AND THE LIKE
Original Filed Aug. 24, 1956 11 Sheets-Sheet 5
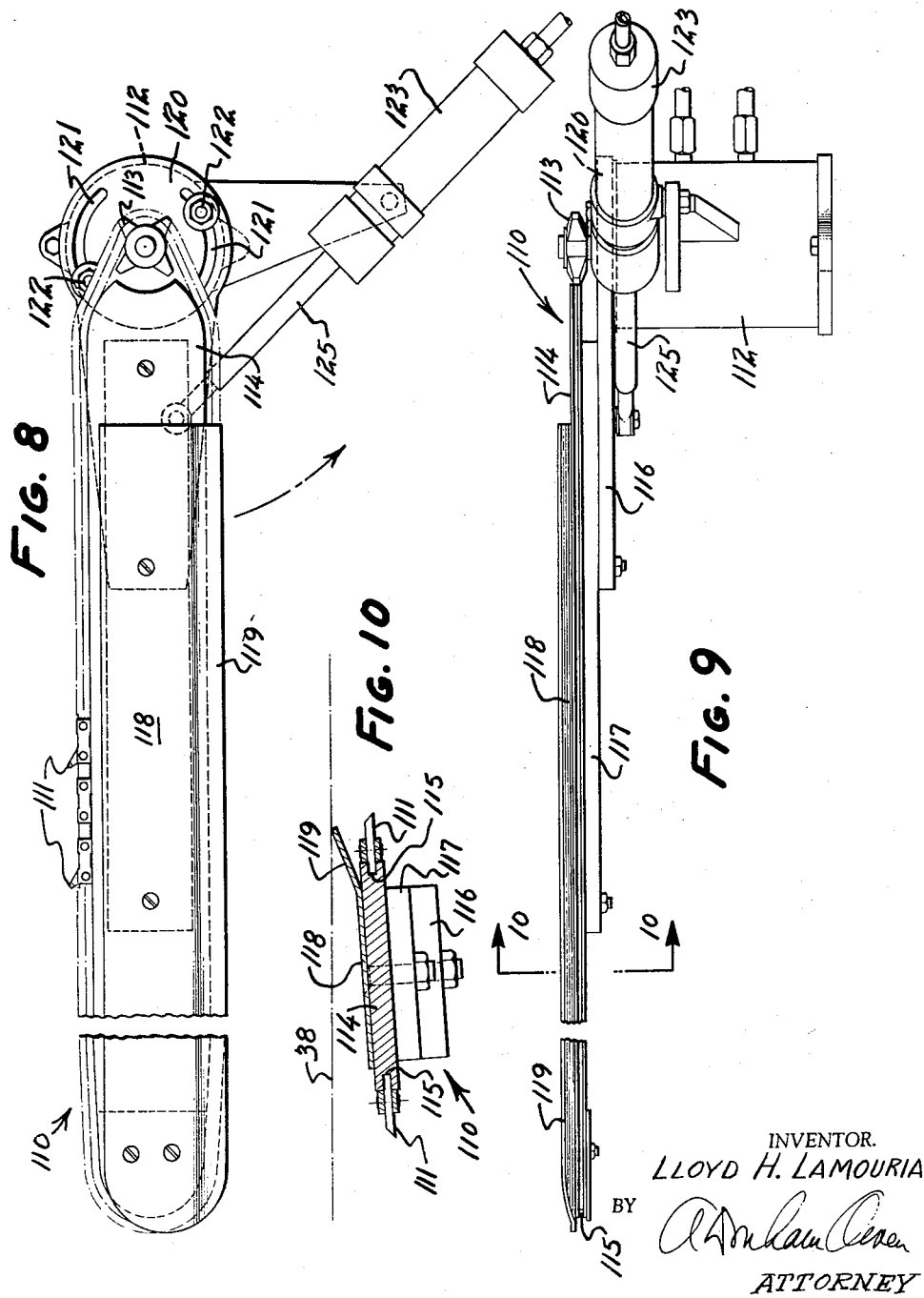
INVENTOR.
LLOYD H. LAMOURIA
BY
ATTORNEY

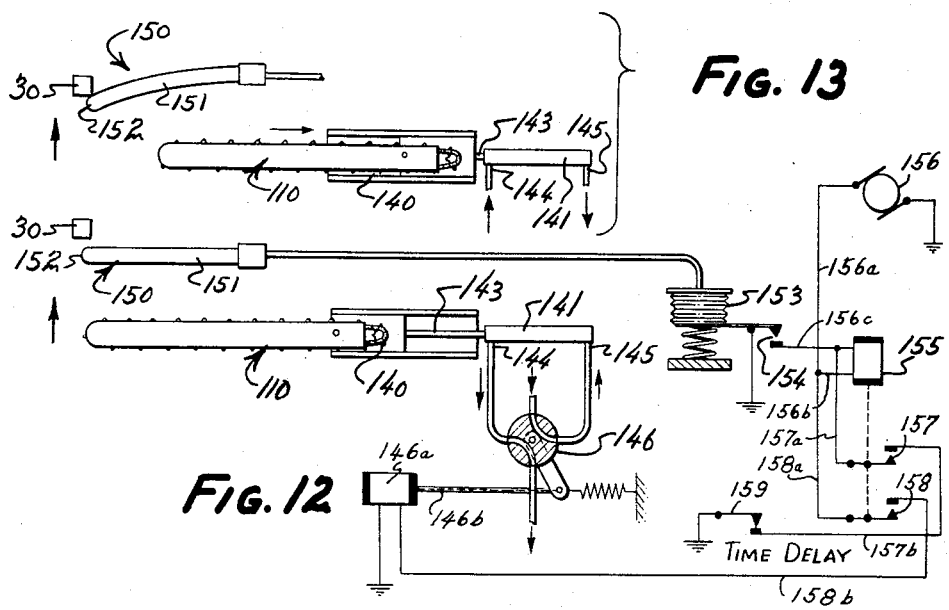
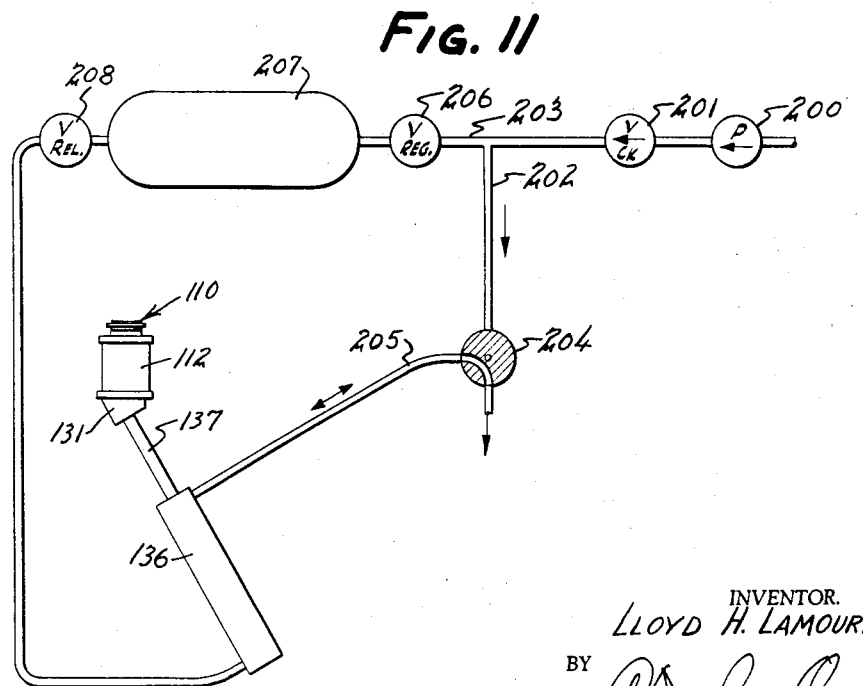

March 22, 1960    L. H. LAMOURIA    2,929,184
METHOD FOR HARVESTING GRAPES AND THE LIKE
Original Filed Aug. 24, 1956    11 Sheets-Sheet 7
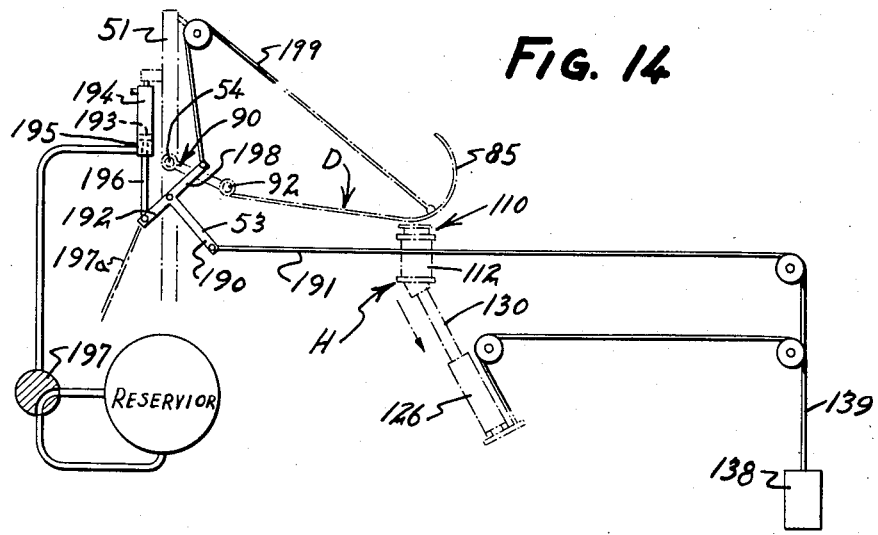
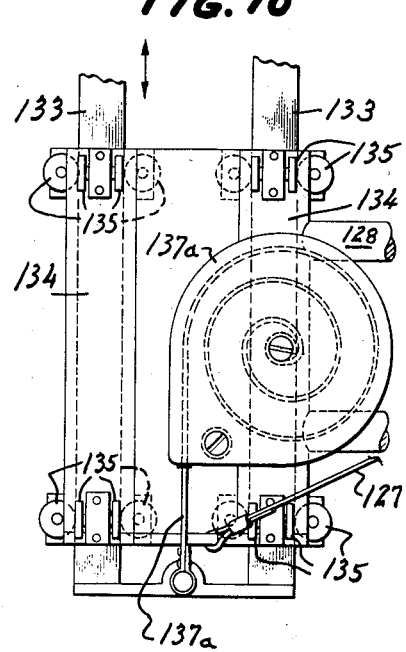
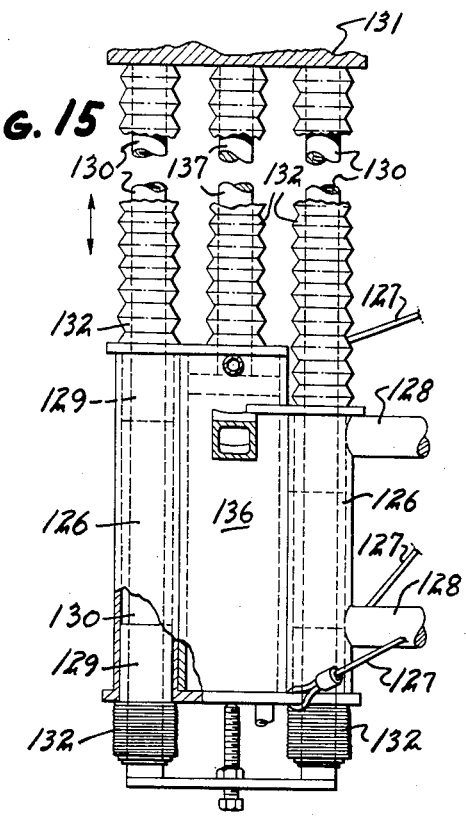
INVENTOR.
LLOYD H. LAMOURIA
ATTORNEY March 22, 1960     L. H. LAMOURIA     2,929,184
METHOD FOR HARVESTING GRAPES AND THE LIKE Original Filed Aug. 24, 1956     11 Sheets-Sheet 8

INVENTOR.
LLOYD H. LAMOURIA
BY
ATTORNEY

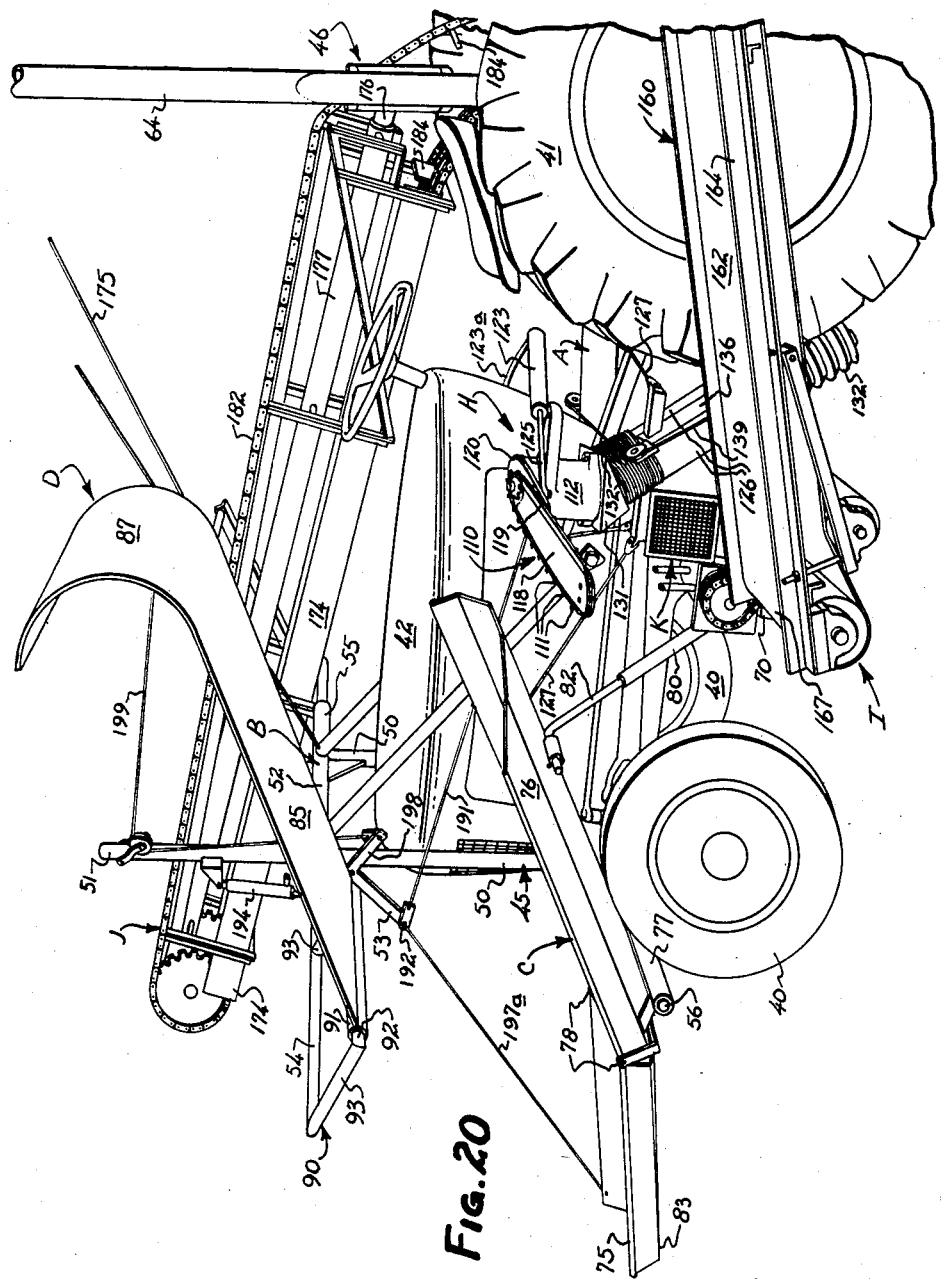

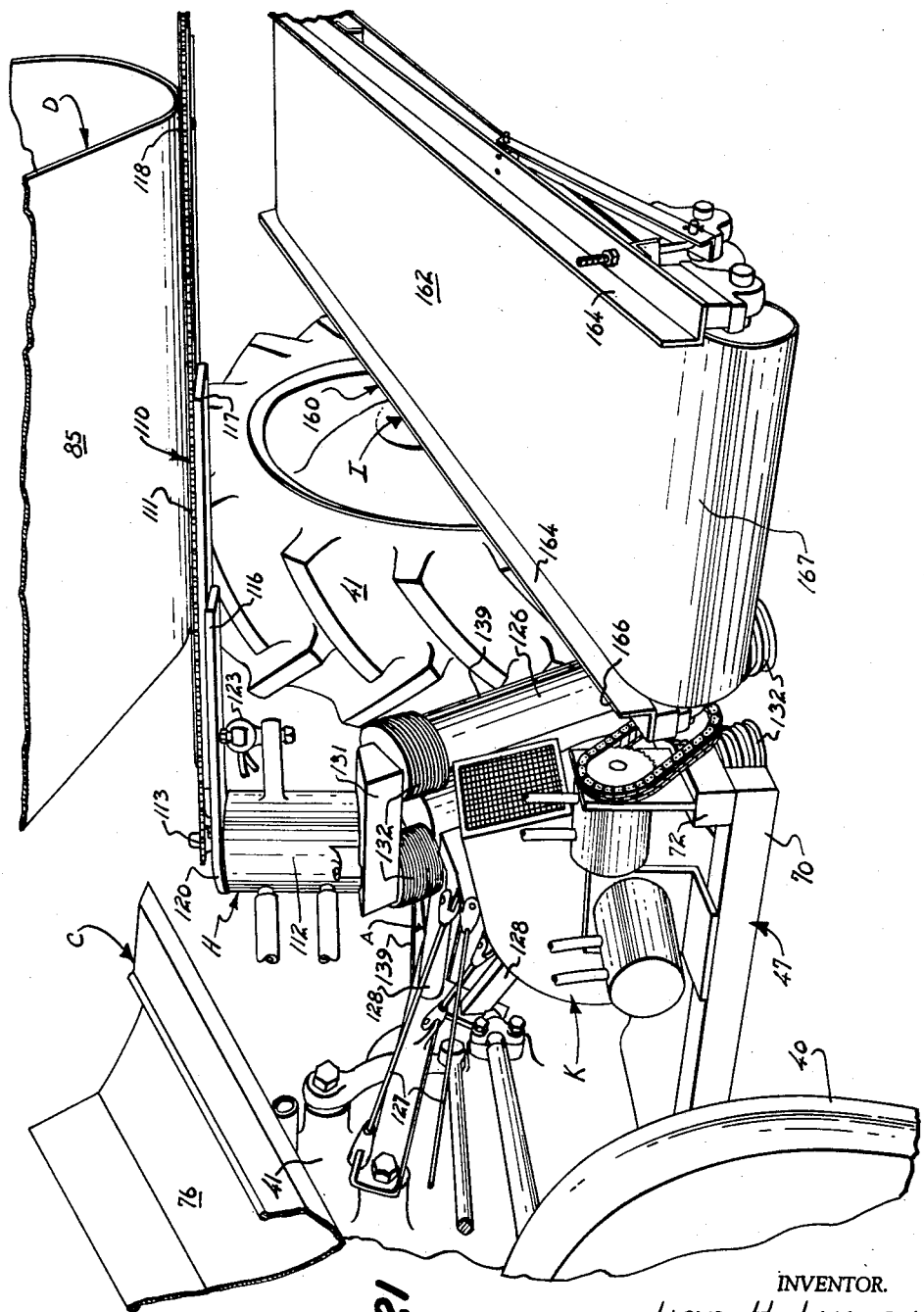

March 22, 1960     L. H. LAMOURIA     2,929,184
METHOD FOR HARVESTING GRAPES AND THE LIKE Original Filed Aug. 24, 1956     11 Sheets-Sheet 11

INVENTOR.
LLOYD H. LAMOURIA
BY
ATTORNEY

United States Patent Office 2,929,184
Patented Mar. 22, 1960

2,929,184

METHOD FOR HARVESTING GRAPES AND THE LIKE

Lloyd H. Lamouria, Davis, Calif., assignor to The Regents of the University of California, Berkeley, Calif.

Original application August 24, 1956, Serial No. 606,145, now Patent No. 2,893,194, dated July 7, 1959. Divided and this application June 24, 1957, Serial No. 673,994

15 Claims. (Cl. 56—1)

This invention relates to improvements in the harvesting of grapes and other vine-borne clustered fruit. More particularly, it relates to a method for harvesting the clustered fruit of vines which are supported by an inverted L-shaped (or similar type) trellis so that the clusters hang down below and between a series of parallel spaced horizontal wires or mesh. This application is a division of my co-pending application Serial No. 606,145, filed August 24, 1956, and issued as Patent No. 2,893,194 on July 7, 1959, wherein the apparatus is disclosed and claimed.

The culture of grapes, whether they are being grown for the table, for wine, or for raisins, has heretofore involved a tremendous number of man-hours, most of which have been concentrated on the harvesting of the grapes. More than one hundred million dollars worth of grapes are now grown annually in California alone, and statistics have shown that the harvesting of these grapes involves more than six hundred thousand manweeks of labor, almost all of which has had to be performed by migrants, so that well-known social problems have resulted. Four-fifths of the working time for this crop has been concentrated in the harvest period.

A few years ago it seemed unlikely that anything could be done to reduce the amount of hand labor required in picking the grapes. However, recent viticultural experiments have resulted in a method of training grapes on a special wire trellis having a series of parallel horizontal wires located approximately 45 inches above the ground. Long-stemmed grape varieties can be trained on this type of trellis to form their clusters at a substantially uniform level below the wire and outside the center line of the stakes. This innovation has made it possible for the present invention to provide for machine harvesting by moving the clusters from the vine. As a result of this invention, the manpower necessary during the harvesting of the grapes can be reduced to between onefiftieth and one-hundredth of the former requirement. Two drivers, each provided with apparatus built according to the present invention, can easily harvest the grapes from a vineyard that heretofore would have required more than a hundred experienced hand pickers. Moreover, while grapes are used herein as an example, the invention can be applied to other types of vine-borne fruit of the types borne in clusters.

Thus, an important object of the present invention is to solve the labor problem in the harvesting of grapes by providing for mechanical grape harvesting.

In achieving this object, it has been necessary to solve a great many problems. For example, when the grapes grow over a horizontal wire trellis, shoots carrying leaves but no fruit hang down to the ground and interfere with access to the grape clusters. They have always been a difficult problem in hand-harvesting and they are no less a problem for machine harvesting. Consequently, another object of the invention is to lift these grapevine shoots out of the way to give the harvester cutting device access to the grape clusters, and to lift the shoots without damaging them or cutting them off.

Another problem that had to be solved for thorough harvesting of grapes grown on trellises of the kind described was how to get all the clusters to hang down as low as possible at the time they are cut off. An important feature of the present invention is that it provides a novel method of harvesting grapes by depressing the canes from above the trellis wires to lower the clusters while the cutting means cuts off those clusters. The apparatus therefore provides means for depressing the canes from above the trellis wires and for pushing the clusters down into the most advantageous cutting position while their stems are being cut.

This depressing of the canes must not break the canes or in any way injure the vines, and so another object of the invention is to accomplish cane depression by a gently urged, yielding, downward pressure from above them without harming the vines or breaking the canes.

The apparatus which may be used to practice the method of this invention preferably comprises a selfpowered vehicle provided with a forwardly-projecting chute at one side thereof to lift the trailing vine shoots from the ground and carry them over the top of the cutting apparatus; a floating, cutting head is mounted on an inclination for smoothly following the lower surface of the trellis wires; a yieldable cane depressing apparatus rides above the wires and pushes the flexible canes down so that the clusters hang at a minimum elevation above the ground where the stems can be cut by the cutting means; a conveyer apparatus catches the clusters as they fall and moves at a speed so related to the forward speed of the tractor that the conveyer upper surface actually remains stationary with respect to the ground; and a blower sends a current of air across the conveyer to blow away leaves and debris. Depending on the crop, means may be provided for elevating the grapes to a wine truck, or for laying them on paper laid down by the machine, or for carrying them to a suitable location for packers to put them into boxes.

Other objects and advantages of the invention will appear from the following description of preferred embodiments thereof, given in accordance with 35 USC 112.

In the drawings:

Fig. 2 is a top plan view of the harvesting device of Fig. 1 shown on an enlarged scale. The wine-grape elevator is shown broken off and also in an alternative position in dotted lines.

Fig. 3 is a side elevation view of the grape harvester of Fig. 2, shown on a reduced scale. The wine grape elevator and its support column are shown broken in two and also in another position in broken lines, and one front wheel has been broken away.

Fig. 4 is a fragmentary view in side elevation of a modified type of depressor including a large pneumatic tire.

Fig. 5 is an end elevational view of the depressor of Fig. 4.

Fig. 6 is a view like Fig. 4 of another modified type of depressor including a series of wheels very loosely mounted on an axle.

Fig. 7 is a view like Fig. 5 of the depressor of Fig. 6.

Fig. 8 is an enlarged fragmentary plan view of the cutter.

Fig. 9 is a view in side elevation of the cutter of Fig. 8.

Fig. 10 is a vertical section taken along the line 10—10 in Fig. 9.

Fig. 11 is a diagrammatic view of a pneumatic circuit for counterbalancing the floating cutter head.

Fig. 12 is a partly diagrammatic and partly representational plan view of a hydraulic sensing and retracting apparatus for the cutter, including a hydraulic circuit and an electrical circuit.

Fig. 13 is a fragmentary view of parts of the senser and cutter of Fig. 12 with the cutter shown in retracted position as a result of the deflection of the senser.

Fig. 14 is a diagrammatic view of a crank and cable system for raising the depressor and lowering the cutter head prior to entry into a row.

Fig. 15 is a view in elevation and partly in section of the cutter head floating support, showing the use of a pneumatic or hydraulic cylinder as a counterbalancing agent.

Fig. 16 is a view in elevation of another modified form of floating support for the cutter head, incorporating a constant tension spring as the counterbalancing apparatus.

Fig. 17 is an enlarged fragmentary view, partly in section, of a conveyer connection to a frame member.

Fig. 18 is an enlarged sectional view of the elevator, taken along the line 18—18 of Fig. 1.

Fig. 20 is a view similar to Fig. 19 showing the depressor elevated and the cutter lowered for entry into a row of vines.

Fig. 21 is a fragmentary perspective view with some parts removed and others disconnected for clearer showing of the relation between the depressor, the cutter, and the chute and the relation between the blower, the cutter, and the conveyer.

General description

Figure 1:
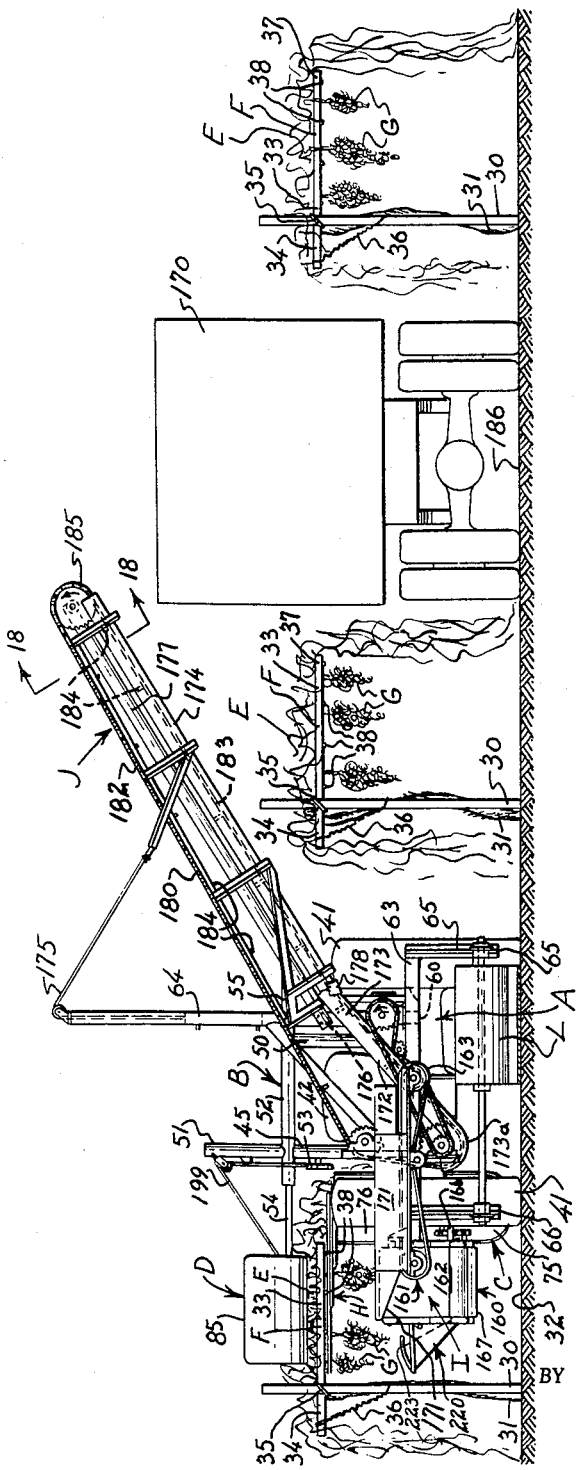
Fig. 1 is a view in rear elevation of a grape-harvesting device suitable for practicing a method embodying the principles of the invention.

The grape harvesting apparatus shown in the drawings illustrates a device which is especially useful in carrying out the method of this invention. It incorporates a self-powered tractor A carrying a frame assembly B which supports all the harvesting apparatus. At one side near the forward end is a vine-elevating chute C which raises the non-fruiting leafy vine shoots that tend to trail to the ground so that they are carried over the tractor and protected from harm during passage of the harvester. Behind this chute C and to the outside of it is located a depressor D which presses on the vine canes E from above a horizontal wire trellis F and urges grape clusters G down below the trellis wires. Substantially directly below the engaging portion of the depressor D is a floating cutting head H which cuts the stems of the clusters G as it passes along just beneath the wires of the trellis F. Below the cutting head H is one end of a conveyer system I, which, in the instance of wine grapes, conveys the clusters to an elevator J. A blower K sends a stream of air across the conveyer I and separates the loose leaves and debris from the clusters G. Also, the frame B supports a paper-laying roll L and a slide M which deposits the grapes on the laid paper in a drying position.

The vine trellis F

In order to use the mechanical grape harvester, it is necessary to provide a type of trellis in which the grape clusters G are formed below a series of parallel wires. One example of a suitable trellis F is shown in Figs. 1–3. The trellis F is provided with a row of vertically extending grape stakes 30, beside each of which is a main trunk 31 of the grape vine. Preferably at about 45 inches above the ground 32 (though this may vary with the kind of grape, soil conditions, etc.), the trellis F is provided with a cross arm 33, one branch 34 of which merely serves for bracing in conjunction with a tie 35 and a stay 36. Along the main branch 37 of the cross arm 33 are secured a series of parallel wires 38, preferably spaced about 4 to 6 inches apart and parallel to the row of stakes 30.

The main trunk 31 thus grows up, as usual, parallel to the grape stake 30, but instead of merely sprawling, the canes E are trained to extend out horizontally over the wires 38 on one side only of the cross arm 33. This may be done by tying the fruit canes E to one of the wires 38, which wire is used depending upon the variety of grape. Thompson Seedless fruit canes E have usually been tied to the middle trellis wire 38, but in other varieties other wires have been used. As the new shoots elongate, they are bent down by their own weight and the weight of the fruit and rest on the upper side of the trellis F with the clusters G hanging free below the wires 38. Hand work is normally required to free the clusters G from the canes E and wires 38 so that they will hang free. However, this work, together with the preferable pruning that promotes better cluster disposition, comes in mid-season when the demand for vineyard labor is slack and may be done by the same people who will later harvest the grapes.

The tractor A

Any suitable make or type of tractor may be used which is small enough to pass between the rows of grapevines, maneuverable enough to give the necessary turning radius at the ends of the rows and to enable it to follow accurately the row of vines, and possessed of sufficient structural strength to support the frame B with all the harvesting apparatus mounted thereon. The tractor A shown in the drawings has front wheels 40, rear wheels 41, engine 42, and driver's seat 43. Some of the power from the engine 42 is used to operate hydraulic motors or other power apparatus for the harvesting device where desired or they may be separately powered if that is preferred. For this reason the engine 42 preferably has sufficient power to run the accessories and still propel the vehicle at an adequate speed. Normally, the tractor will move relatively slowly, at about 1.5 miles per hour. However, when going between fields, a somewhat faster speed is normally desirable.

The frame B

The frame B is removably mounted on the tractor A so that the tractor A can be used for other farm work during the remainder of the year. It is quite a simple operation to install the frame B on the tractor A at grape harvesting season. While the frame B may be built in one piece, that is not necessary, and, as shown in the drawings, the frame B may as well be built in three separate sections, a front frame member 45, a rear frame member 46, and a side frame member 47.

The front frame member 45 (see Fig. 2) incorporates two parallel vertical columns 50 and 51 and an upper horizontal cross member 52 which connects the columns 50 and 51 and extends beyond each of them. The tractor A is arranged so that the cutting is done on one side thereof; so the frame B is asymmetric. The column 51 on the cutting side extends upwardly beyond the cross bar 52 and supports a bell crank apparatus 53 which will be explained subsequently in a separate section. A projecting arm 54 mounted rotatably in the cross member 52, supports the depressor D in a manner to be explained below, while a projecting arm 55 on the opposite side of the tractor A serves to support the upper end of the elevator J when the elevator J is in its transporting position (shown in dotted lines in Fig. 2), as distinguished from its use position (shown in solid lines in Figs. 1 and 2). At the lower end of the column 51 is secured a frame bar 56 which supports the chute C.

The rear frame member 46 is preferably secured, as by bolts, to the two rear fender pads 60 on the rear axle housing of the tractor A and comprises two rearwardly axially extending horizontal members 61 and 62, to the rear end of which is secured a cross member 63. Extending upwardly from the member 60 is a column 64 which supports the elevator J. The frame member 63 supports part of the conveyer system I in a manner to be explained subsequently. The paper-laying roll L and slide M are also supported by the rear frame member 46 through depending arms 65 and 66. The mounting and operation of the various parts on the rear frame member 46 will be explained below in the indicated sections.

The side frame member 47 comprises a main laterally extending bar 70 bolted to the tractor A, near one end of which a short bar 72 extends axially and rearwardly therefrom. The side frame bar 70 is provided with a bracket 73 (see Fig. 17) which supports the forward end of the side section of the conveyer system I while the bar 72 supports the blower unit K which directs the air current laterally across the conveyer I to blow off dead leaves and other debris which may fall on the conveyer during the picking of the cluster G. The blower K is particularly important when the grapes are being picked for drying as raisins, because the dead leaves could prevent proper drying and induce mildew and other fungus which would spoil the grapes.

In addition to the three frame members 45, 46, and 47, support for the floating cutter head H is provided by a structure to be described under the appropriate heading for that element.

The shoot chute C

The chute C preferably comprises two sheet metal members 75, 76. The longer rear portion 76 of the chute C is mounted to the front frame member 45 along a horizontal axis by a pivot rod 77, while the shorter front chute portion 75 is pivotally attached to the rear chute portion 76 by pins 78. Thus the front chute member 75 can be lifted above the ground around its pivot pins 78 when passing over rough ground, when turning around the rows of vines, or at other desirable times without affecting the rear chute portion 76.

The rear chute member 76 is spring urged into a position with its forward end 79 normally pushed downwardly or counter-clockwise as shown in Fig. 3. This may be accomplished by providing a tube 80 extending diagonally up from and secured to the side frame member 47 so that in the normal position of the chute C the tube 80 will be substantially perpendicular to the chute portion 76. A smaller tube 82 secured to the chute is adapted to telescope loosely into the larger tube 80 and to engage a helical spring 81. The spring 81 then urges the smaller tube 82 upwardly and outwardly, achieving the desired urging of the chute C and at the same time providing sufficient resiliency for rotation of the chute portion 76 about a small arc when it is heavily loaded with vine shoots. A constant force spring could be used in place of an ordinary helical spring 81. In either event the spring maintains the discharge (upper) end of the chute 76 at the elevation of the cross arms 37 of the trellis F.

The front chute portion 75 is adapted, when in use, to ride as close to the ground 32 as possible, with its forward end 83 normally about four inches above the ground. Obviously, this height is too low to permit movement over heavy clods or rough territory and therefore means are provided (described in a subsequent section) for raising the front end 83 of the chute portion 75 when passing over this territory. This is preferably accomplished by unitary bell-crank control or other similar means in connection with the depressor D and floating cutting head H and therefore description will be deferred until after those elements have been described in detail.

The depressor D

An important part of the method of this invention is the exertion of a downward resilient pressure on the canes E above the wire trellis F and directly above the floating cutting head H, so that the clusters G of grapes or other fruit are lowered to a minimum elevation above the ground level 32 at the time of cutting. This reduces fruit loss due to the cutting mechanism H slicing through the middle of a cluster G of grapes and also assures good stem length below the wire. Too, it means that a maximum yield is obtained, for even with hand care at intervals during the growing season, some of the clusters G tend to lie above the wire trellis F or very close thereto. The simultaneous cane depressing and cutting motions achieved by this invention is one of its most important features for it greatly increases the harvest yield and leaves few grape clusters on the vine.

The depressor D may vary in structure. One example, shown in Fig. 3, comprises a sheet metal member 85 having a relatively long, straight, flat portion 86 and a curved arcuate end portion 87. The depressor 85 is mounted pivotally at the free end 88 of the straight portion 86 so that the arcuate portion 87 rests on the vine canes E as the tractor A passes along beside the trellis F. The weight of the depressor 85 rests on the canes E at the arcuate portion 87 and rides over them, rising over strong canes E and urging downward the more flexible canes.

Farmers cannot be expected always to make exactly the same height of trellis F and vines of different breeding may vary in preferable height; therefore it is highly preferable for the depressor D to be adjustable vertically. The vines may in some instances be trained on trellises F as low as about 36 inches, and in others the trellis height may be about 54 inches instead of the more desirable 45-inch height. To permit this adjustment, the pivoted free end 88 of the depressor 85 is connected to a generally rectangular frame or suspension means 90. An outer pipe 91 secured to the end 88 of the depressor 85 is freely rotatably mounted along a horizontal axis about a frame member 92. End arms 93 extend perpendicular to the member 92 and connect it to an opposite frame member 54 which, in turn, is mounted rotatably in the frame member 52.

The sheet metal depressor 85 works very well in most instances but somewhat improved results can be obtained in many installations by using a modified form 100 of depressor D involving a pneumatic roller type of construction. For example, a low-pressure wheel 101 which in shape more nearly resembles a roller may be mounted on a suitable axle 102 carried by a yoke 103 attached to the projecting arm 54. This type of depressor 100, shown in Figs. 4 and 5, can give in one portion as it rides over a projecting portion of a cane E while the remaining portions of the wheel 101 still exert the gentle downward pressure on the remainder of the vine and force the clusters G down into the proper position for picking. The advantage of this structure 100 over the sheet metal depressor 85 is that a large cane E will deflect the entire width of the sheet metal structure 85 upwardly while only that portion of the pneumatic member 100 in the close proximity of the cane will be deflected and the remaining portions of it still depress the rest of the vine.

Another modified depressor 105 is shown in Figs. 6 and 7 and consists of a series of wheels 106 very loosely mounted on an axle 107. The loose mounting enables them to be individually pushed up by a stiff cane, the clearance space between their inner periphery 108 and the axle 107 serving to provide the necessary deflection movement. When one of these wheels 106 is pushed up, the other wheels 106 are still free to maintain the requisite pressure on the thinner canes and stems and to hold the clusters G down into the proper picking position. Since these wheels 106 are individually suspended, there is no need for them to be pneumatic, and they may, if desired, be solid rubber or any other suitable material which will not injure the vines.

Actually, it is also possible to use a single metal roller similar in shape to that of the large pneumatic wheel 101, but it should be understood that this would have no advantage over the sheet metal depressor 85 so far as its ability to deflect under the pressure of strong canes E and to retain pressure on the weak canes is concerned.

The floating cutting head H: the cutter 110 itself

The floating cutting head H follows beneath the wires 38 of the trellis F and cuts off all parts of the grapevine that hang below the wires 38, not including the trailing shoots lifted by the chute C. With the vines trained as stated, this means substantially only the bunches G of grapes, and it means substantially all of these bunches.

A preferred structure for the cutting head assembly H is illustrated in Fig. 2. The actual cutter assembly 110 (see Figs. 8–10) comprises a chain knife or saw 111 or sickle driven by a suitable hydraulic (or other type) motor 112. The chain 111 is driven by a sprocket 113 mounted on top of the hydraulic motor 112 and moves the chain around a supporting frame or flat bar 114, a guide groove 115 of the usual type serving to guide the chain 111 in its circuit. Suitable supporting plates 116, 117 may be provided beneath the chain frame or bar 114 to maintain the desired rigidity. The upper surface of the bar 114 supports a chain guard and deflecting member 118. This member 118 consists of a plate whose forward portion is substantially flat and whose rear portion 119 is inclined upwardly. This inclination raises the level of the rear portion 119 above that of the remainder of the guard 118 and therefore protects the forward teeth of the chain 111 from contact with the trellis wires 38 and protects the wires 38 from contact with the teeth. Normally, the cutter 110 is tilted slightly forward so that this effect is enhanced. The outboard side edge of the guard 118 protects the outboard teeth of the chain 111 from contact with the grape stakes 30. The rear portion 119 of the chain guard 118 extends back over the return passage of the teeth and prevents contact between them and any portion of the vine or wires 38. This is especially necessary when the cutter 110 is inclined.

The cutter 110 with its chain knife or saw 111 may, if desired, be replaced with other types of cutting members suitable for the purpose, such as oscillating sickle bars, circular saws, band saws, etc., depending upon the particular application, the size of the trellis F to be serviced and other factors. However, the form prescribed is the preferred one which has given excellent results.

The cutter 110 should be protected from accidental contact with grape stakes 30, vine trunks 31, etc. It should not be mounted rigidly so as to be broken or damaged if an obstruction is met. One way of doing this is to provide a swivel construction with constant energy pressure exerted to urge the cutter 110 to its normal cutting position.

In the device shown in Figs. 8 and 9 it will be seen that the cutter 110 is mounted on top of the hydraulic motor 112 by means of a plate 120 forming part of the assembly 110 having a pair of diametrically opposite arcuate slots 121 preferably extending about 45° of arc. A pair of bolts 122 ride in the slots 121 so that the cutter 110 is rotatable over an angle of about 45°. The same bolts 122 may also hold the cutter 110 and hydraulic motor 112 in place. The pressure to urge the cutting chain 111 into a normally lateral position and to restore it to that position whenever it is deflected may be provided by a constant-energy hydraulic cylinder 123 with an accumulator circuit 123a (Fig. 20). A piston for the cylinder 123 may have rod 125 with its outboard end secured to the plate 116 a short distance away from the center of the plate 120. The cylinder 123 itself is supported a short distance away in proper alignment and is loaded so as to provide a yieldable means that permits the necessary deflection when the end of the cutter 110 strikes a grape stake 30 or vine trunk 31 but not to permit the relatively flexible grape stems to deflect the cutter 110. For this purpose the cylinder 123 may be loaded with fluid under pressure so that with a 3-foot cutter blade a force of 50 pounds at the outboard end will deflect the cutter 110. With this type of device the driver, of course, tries to avoid striking the stakes 30 or vine trunks 31. However, if he should strike one, no harm is done to the cutter 110, because it is merely momentarily deflected at a slight angle until it has cleared the stake 30 and then is restored to its original position by the constant-energy accumulator circuit.

The floating cutting head H: floating mechanism

As noted earlier, it is important to so mount the cutter 110 that it will follow the wires 38 and not move up and down with the tractor A. It must follow the wire 38 where it sags between stakes 30 and where the space difference between the ground 32 and the wire 38 varies due to any cause. In providing a cutting head H which will float, several structures are possible. Briefly, these include the use of a counter-weight, of a hydraulic mounting, of a pneumatic mounting, or of a constant-energy spring.

The floating mounting shown in Fig. 15 employs a cutter guide means comprising a stationary pair of supporting tubes 126 secured to the tractor frame by tension cables 127 and rigid spacing bars 128. The tubes 126 are preferably inclined at about 30° to the vertical (see Fig. 3). The importance of this is that, when the floating cutter 110 follows the sagging path of the wire 38 the force acting on it includes not only the downward pressure but also a horizontal component; so the force tends not only to depress the cutter 110 but also to push it back. By making it possible for the cutter 110 to move freely back under the force of the wire, the problem of horizontal pressure binding the column and preventing vertical retraction is avoided.

The inclined tubes 126 are provided interiorly with ball-bushings 129 so as to provide anti-friction motion. A pair of rods 130, are adapted to move in the ball-bushings 129 and inside the tubes 126, and the rods 130 rigidly support a cutter-supporting member 131. The rods 130 are, of course, inclined at the same 30° angle as the tubes 126, while the support member 131 for the cutter 110 and hydraulic motor extends substantially vertically. When the cutter 110 contacts a sagging portion of the wire 38, the pressure on the cutter 110 is transmitted to the support member 131 and from that to the rods 130, forcing them back and down in the anti-friction bushings 129 in the tubes 126. To prevent the anti-friction device from being worn or scored by dirt and other foreign matter, suitable bellows boots 132 are connected between the tubes 126 and the support member 131 and at the lower end of the rods 130.

Figure 23:
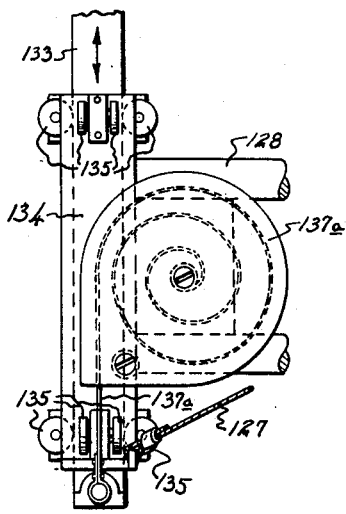
Fig. 23 is a fragmentary view like Fig. 16 but showing a modified form of guide and support mechanism.

While the usually preferred structure has just been described, other structure is possible. For example, the cylindrical rods 130 may be replaced by square bars or tubes 133, and the tubes 126 replaced by correspondingly larger square tubes 134 and rollers 135 provided to contact the bars 133. This structure is shown in Fig. 16. The rollers 135 are mounted on the outboard tube 134 and reach inwardly and contact the center tube or bar 133, and the inner square members 133 are therefore able to ride back and forth with relatively low friction. The friction is somewhat greater than that provided by the ball-bushing structure heretofore described, but is perfectly satisfactory for commercial operation. In fact, a single column 134 and single tube 133 give excellent results, as shown in Fig. 23 and there is no necessity for employing the double column structure illustrated in Fig. 16.

Means have to be provided for urging the cutter guard 118 at all times against the lower surface of the wires 38, and that means of course must be yieldable. Figs. 1–3, 11 and 15 show the use of a pneumatic or hydraulic cylinder 136 mounted in between the tubes 126, with a piston and rod 137 connected to the supporting member 131. The cylinder 136 is arranged so that the piston and rod 137 are urged upwardly by air pressure of the desired amount and overbalancing the cutter head plus friction by about 25 pounds.

Fig. 11 shows in solid lines a pneumatic circuit that may be used. A compressor 200 or other source sends high pressure air through a check valve 201 and into branching conduits 202 and 203. A three-way valve 204 converts the conduit 202 to a conduit 205 leading to the upper end of the pneumatic cylinder 136. Thus, when the valve 204 joins the conduits 202 and 205, high pressure air will force the piston and rod 137 down, lowering the cutter 110. In its other position the valve 204 bleeds off to the atmosphere the conduit 205 and upper part of the cylinder 136.

The conduit 203 leads through a low-pressure regulating valve 206, storage and cushion cylinder 207, and relief valve 208 to the lower end of the cylinder 136 and acts to float the piston and rod 137 and cutter 110 whenever the valve 204 is open to the atmosphere, while the relief valve 208 enables rapid accommodation of sudden effects. Obviously, operation of the valve 204 from the tractor controls 44 determines whether the cutter 110 is lowered for entry of a row or is floated upwardly.

Figure 22:
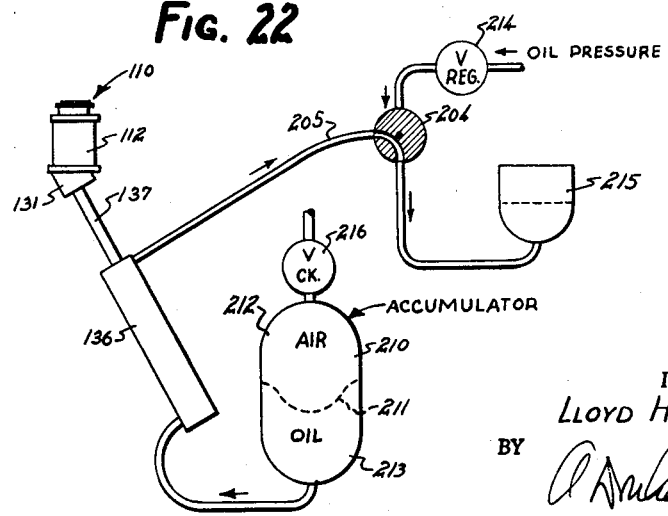
Fig. 22 is a diagrammatic view of a pneumatic circuit for counterbalancing the floating head, showing a circuit that may be used in place of the circuit of Fig. 11.

Fig. 22 shows elements of a hydraulic system utilizing an accumulator 210 provided with a diaphragm 211 of neoprene or the like to provide an upper low-pressure air chamber 212 and a lower oil chamber 213. This accumulator 210 is connected in place of the valves 206 and 208 and cylinder 207. Also, the three-way valve 204 is, in the hydraulic system, connected to a source of high pressure oil 214 at one position and to a reservoir (not shown) at another position 215, since the oil cannot of course be bled to atmosphere. The upper end of the accumulator 210 is sealed off, as by a Schrader valve 216, so that the low pressure floating return for the piston and rod 137 comes from the accumulator chamber 213 under pressure of the air 212 when the valve 204 is open for free passage of the air to the reservoir via 215. Operation is substantially similar to that of the pneumatic circuit of Fig. 11, but no compressor is needed.

In place of the hydraulic or pneumatic cylinder, it is possible to use a constant-force spring 137a (see Fig. 16) such as that described under such patents as Nos. 2,609,191 2,609,192, 2,609,193 and 2,647,743. This structure is now well known in the art and therefore further description of its exact application is unnecessary. The loading pressure is preferably substantially that described and the mounting may be in a location analogous to that of the cylinder 136 in the hydraulic or pneumatic devices described.

Fig. 14 shows how a counterweight 138 may be used for the same effect. It is attached by cables 139 to one of the rods 130 adjacent its lower end. While this counterweight 138 may be located in any desired position, it may be convenient to mount it on the opposite side of the tractor A from the cutter 110, with the cable 139 extending over suitable pulleys. The counterweight 138 is so balanced that the individual grape stems or other projecting matter will not unduly depress the device and so that it will rise readily. The cutter 110 therefore continues to ride along the wires 38 and maintains contact on the way up, due to the urging of the counterweight. Preferably, the counterweight urges the cutter 110 to an upward position with about 25 pounds of net upward weight.

The cutter assembly H need not be located at the position shown in the drawings, which is shown only by way of example. It may be mounted further front, further back, and in fact may be located on the rear of the tractor A. Obviously, a change in the location of the cutter H requires a change in the location of the depressor D and the conveyer I. Nor need the cutter 110 be tilted as shown in Fig. 9, and for some applications it is better for it to be level, while the 1° or 2° inclination shown is better for other applications.

The floating cutting head H: retraction apparatus

In place of the swinging swivel-construction heretofore described, it may be necessary for certain applications to instead provide a retraction device to pull back the cutting member laterally instead of swinging it. This structure is used where the growers, either through carelessness, preference or lack of time, are unable to prevent a substantial number of grape clusters G from forming directly in line with the stakes 30. It is therefore desirable to have the cutting member 110 move so that its end actually extends beyond the stakes 30 and to retract it each time a stake 30 and trunk 31 is approached, restoring it shortly thereafter.

An example structure of this type is shown in Figs. 12 and 13. In this event, the hydraulic motor 112 and cutter 110 are mounted upon a retractable plate 140 which is mounted slidably in any convenient manner for movement solely along a direction lateral to the path of the tractor A. A double action cylinder 141 is provided on a suitable stationary bracket with its piston 143 secured to the retractable plate 140 on which the cutter 110 rides. If suitable fluid is introduced at the left-hand port 144 of the cylinder 141, as shown in Fig. 12, this will cause the piston 143 to move to the right and therefore retract the cutter 110; whereas, if fluid is introduced into the right hand port 145 of the cylinder 141 while bleeding the left port 144, the piston 143 is forced to move to the left, restoring the cutter 110 to its original position. The movement of the fluid may be controlled by a three-way solenoid valve 146 which, in turn, is operated by a novel hydraulic sensing unit 150.

The hydraulic sensing unit 150 incorporates a flexible fluid container 151 such as a rubber-hose member, with the outer end 152 capped, mounted in a suitable position, preferably on the side of the conveyer I, so that it will extend somewhat beyond the end of the cutter 110 and in front of it. It therefore will contact the grapestake 30 or vine trunk 31 before the cutter 110 can touch them, and it will be sure to contact any stake which lies in or very close to the path of the cutter 110.

When this sensor 150 is deflected, as shown in Fig. 13, the fluid in it is displaced and expands a bellows member 153 which, in turn, is provided with a micro-switch 154. Closure of this switch 154 causes current to flow from a generator 156 to energize a relay 155. Energization of the relay 155 closes the switches 157 and 158. So current flows from the generator 156 via lines 156a and 156b, relay 155, line 156c, and switch 154, to ground. Current also flows from the relay 155 via line 157a, switch 157, and line 157b to a time-delay switch 159 and thence to ground. Current also flows from the generator 156 via lines 156a, 158a, switch 158, and line 158b to energize a solenoid 146a, pulling in its core 146b and opening the solenoid valve 146. As a result the flexible member 151 will not, upon passing by the grapestake 30, permit the cutter 110 to be projected to its original position where it would, of course, strike the stake 30. The time-delay 159 is calculated to permit the passage of a sufficient amount of time to insure passage of the cutter 110 past the stake 30 or other obstruction, and thereupon to open, thereby opening the relay 155 and the circuit to the solenoid 146a. The three-way valve 146 with a spring-offset spool maintains oil pressure against the right-hand side of the piston. Closure of the circuit energizes the three-way solenoid valve 146, sending the fluid into the left-hand port 144 of the cylinder 141, while opening the circuit deenergizes the solenoid valve 146 and sends fluid into the right-hand port 145 of the cylinder 141.

This sensor-retractor combination can be used for retracting French plows, cultivators, etc., as well as for grape harvesters, and for retracting any kind of member working between stakes in a vineyard.

The conveyer I and blower K

The conveyer assembly I preferably comprises a pair of conveyers 160 and 161, each provided with a suitable belt 162, 163 and suitable housing 164, 165. The housing 164 of the longitudinally extending side conveyer or longitudinal pass 160 is preferably held by a pair of brackets 166 (Fig. 17) that engage brackets 73, one of which is on the side frame 47 and the other of which is on the rear frame 46. The rear, laterally-extending conveyer or lateral pass 161 is preferably suspended in like manner from the rear frame 46.

The conveyer 160 is located with its forward end 167 substantially directly below the full forward position of the floating cutting head H so that any cluster G of grapes cut off by the cutter 110 will fall directly onto the conveyer 160. A sheet metal chute or slide 168 is preferably provided adjacent this end to assure a complete gathering of all the fruit onto the belt 162.

Opposite the belt 162, as stated before, is the blower K which serves to blow dead leaves and other material than fruit off the conveyer belt 162 and thereby, as stated before, prevent subsequent damage to drying raisins.

The longitudinally extending conveyer belt 162 preferably is inclined upwardly toward the rear to raise the fruit clusters G to a more convenient level. The most important thing about it, however, is its motion relative to the motion of the tractor A and to the ground which the tractor A is passing over. The skin of fruit is very sensitive and although breakage of grapes is not so detrimental when they are being used for wine, it is inconvenient for it to happen prior to its arrival in the wine truck 170. The skin of grapes can be protected from fracture, I have found, by equating the speed of the conveyer belt 162 toward the rear to the speed in the opposite direction of the tractor A over the ground. This is easily done by connection to the engine 42 of the tractor A or with an auxiliary drive so that the forward ground speed of the tractor A is exactly balanced by a rearward passage of the upper surface of the belt 162. In this manner the effect is the same as though the grapes had been deposited upon the ground and were never moved in a longitudinal direction but had only fallen free. The minimum amount of damage to them results and, at the same time, the grapes are being conveyed toward the rear of the tractor A and lifted.

The next important accomplishment of the conveyer system is to get the clusters that have been picked out from under the horizontal trellis F before the vine shoots are dropped to the ground. This is accomplished by the laterally extending conveyer 160 to which the grapes are transferred by means of a sheet metal chute 171.

Once the grapes are out from under the vines, their disposition depends upon the type of grape which is being harvested. If it is a table grape, any type of conveyer system that will transmit them to the box packers is satisfactory, or they may be even taken directly off the laterally extending conveyer belt 163.

The elevator J for wine grapes

For wine grapes, a sheet metal chute 172 transfers the grapes from the conveyer 161 to the elevator J. The elevator J is what might be called an inside-out type of elevator. It is provided with a two-segment chute, one chute 173 of which is permanently in position, extending laterally and being inclined upwardly and away from the grape vines being harvested. It has a well 173a at its lower end so that the juice from crushed or bruised grapes is retained.

The upper chute segment 174 is made swingable so that it can be rotated into a transporting position where it will take up much less room than when it is being used. As shown in Fig. 2, in its transportable or storage position the chute 174 is inclined at an angle that is flatter than the angle of the rear stationary chute 173 member and it rests upon the front frame member 55. Suitable hydraulic means are provided within the column 64 which supports the upper chute 174, together with cables 175 and a transverse arm 176, and an inclined main support tube 177 is provided for both rotating the chute 174 to a lateral position from its longitudinal position and for elevating it to the same angle as the lower chute segment 173. A suitable seal member 178 is provided between the two chutes 173, 174; the seal member 178 comprising a generally U-shaped plate with a rubber sealing lining. It is attached pivotally to the swinging chute 174 and adapted to engage the lower chute 173 in a sealing engagement which permits flexibility and relative rotation. It also operates as an expansion joint.

The elevator proper is of the chain-flight type, with the flight members 184 being spaced along a chain 180 which rides within a suitable guard 181 in the lower chute 173 and in the upper chute 174. The return chain 182 is higher than the conveying chain 183, bar or board flights 184 doing the actual conveying. This means that the grapes are carried up by each flight and, as the flight 184 turns over the top 185, are dropped through the open end, thereby provided, into a truck 170 or other conveyance. The conveyer is preferably made of sufficient length, height and inclination so that the grapes are carried directly into a truck 170 riding into the adjoining access space 186 between the rows of grapevines. As stated before, this is far preferable to having the truck 170 follow the tractor A in the same row, where it would be slowed down by the tractor and could not be driven off as soon as filled but would have to wait until it reached the end of a row. By using the elevator J it is possible for the truck 170 to drive off immediately when filled and for a succeeding truck 170 immediately to take over.

Treatment of raisin grapes

When the grapes are grown for raisins, it is, of course, essential to dry them, and therefore it is not desirable to use the elevator J or to pack them immediately but, instead, to place them upon suitable paper or trays in the sun. This invention enables this to be done automatically. A paper-laying roll L is suspended from the rear frame 46 (or, if desired, may even be suspended, in some instances, from the front frame member 45 or from the underside of the tractor A) in a desired position relative to the rows of grapes. It should be brought out that vineyards are not usually oriented to the compass in such a manner that the space in between vines has equal sunlight; if it were, it would be preferable to deposit the grapes in the middle of the space. Instead, the rows of vines usually run east and west and it is therefore desirable to deposit the grapes nearer the north side of the space, where there is much more sun and where drying can be hastened and more properly carried out. In the device shown in Fig. 1, the paper roll L is adapted to be mounted, therefore, at either of the two sides of the tractor, depending upon which direction the tractor A is being driven and which side the grapes are being grown on. Once the roll L is arranged for a given vineyard, of course, it need not be changed. The roll may be set to contact the ground and thereafter unroll itself or a portion may be unrolled, some grapes placed thereon to weight it, and the unrolling be accomplished by movement of the tractor A. As it unrolls, the conveyer 160 and chute M deposit the grapes in the desired position. At the end of each row, the paper may be cut and a new length started at the next run.

Preparing the grape harvesting machine for entering a row of vines

Upon entering a row of vines, it is desirable to do three principal things: (1) to raise the forward part 75 of the chute C so that it will clear any clods during the turning operation in getting ready; (2) to raise the depressor apparatus D so it certainly will over-ride the vines and not accidentally get underneath any portion of them during the initial positioning; and (3) to lower the floating cutting head H, so it will be sure to enter beneath the wires 38 rather than above them. This may be accomplished by several suitable means, one of which is shown in Figs. 3 and 14. Here, a bell-crank 53 is pivotally secured to the frame member 51. From the central leg 190 of the T, a cable 191 may pass over suitable pulleys to the counterweight 138, preferably by being spliced to the counterweight cable 139. Therefore, rotation of the crank 53 in a clockwise direction as shown in Figs. 3 and 14 will raise the counterweight 138 and lower the cutter head 110.

The left-hand arm 192 of the T member is connected to the piston 193 of a suitable hydraulic cylinder 194 so that the supply of fluid into the port 195 at the lower end of the cylinder 194 will move the piston 193 upwardly and the rod 196 will swing the bell-crank 153 around its pivot, in a clockwise direction. Operation may be achieved by a two-way solenoid valve 197 connected to a tractor reservoir for the hydraulic fluid, and the valve may be actuated by controls within reach of the operator.

This same end 192 of the bell-crank 53 may be connected by a cable 197a to the forwardmost end 83 of the lower chute member 75, so as to elevate it off the ground simultaneously with the lowering of the cutter 110.

The opposite end 198 of the crank-arm is connected by a suitable cable 199 to the depressor D and therefore operates to raise it when the crank 53 is rotated in a clockwise direction as shown in Figs. 3 and 14. Thus, with one simple control for the hydraulic cylinder, the operator can raise the cane depressor D and forward chute member 75 and depress the cutter 110. He is then in a position to enter the row of vines, and after he has entered it, by throwing his control in the opposite direction, he restores the cane depressor D to its operating position, so that the cutter 110 floats into its wire contacting position, and lowers the forward end 83 of the chute C so it can gather the vine shoots.

If a hydraulic counterbalance is used instead of the counterweight 138, the crank may be shaped somewhat differently than shown, since only the top arm portion 192, 198 of it would be needed. In that event, the hydraulic cylinder 136 itself would be directly actuated either by the same or an adjacent control member which the operator would energize.

Operation

The tractor A with the frame B assembled thereon is moved from its storage to the vineyard with the forward chute member 75 elevated so as to clear the clods and other obstructions, and with the depressor D and cutting head E simultaneously moved to their non-operating, spread-apart positions. This is accomplished, as has just been stated above, by operation of the cylinder crank-arrangement 53 or by an equivalent device. Upon arrival at the vineyard, the tractor A is aligned with the rows so that the cutter 110 is on the proper side of the tractor A as it enters into the L-shaped trellis F.

With the cane depressor D raised and the cutter 110 lowered, the row is entered and the operator then operates the valve or other device to move the depressor D to its lowered operating position, the cutter 110 to its raised operating position, and the forward part 75 of the chute C to its lowered operating position. As the tractor A moves forward at approximately 1½ miles per hour, the chute C gathers the vine shoots and lifts them over the cutter 110. The depressor D pushes down upon the vine canes E and urges the clusters G into the proper position for cutting, where they are at the minimum distance above the ground level. The cutter 110, being in contact with the wires 38 directly below the depressor D and being energized by the operator so as to rotate the chain 111 or energize any other cutting mechanism, cuts off the clusters G of grapes as it comes into contact with their stems.

The clusters G then drop into the conveyer-belt 160, being guided there by the chute 168. The conveyer-belt 160 conveys them back at substantially the speed of the tractor A relative to the ground, so that so far as the grapes are concerned there has been no actual movement. At the forward end 167 of the conveyer belt 160 the blower K disposes of any waste material and assures that the clusters G are passed free from foreign matter back to the rear end of the conveyer belt 160. There, they are transferred to the lateral conveyer belt 161, from whence they are either packed, if they are table grapes, or transferred to the elevator J if they are wine grapes, or transferred by the slide M to the paper L, if they are raisin grapes. The wine grapes are conveyed by the elevator J up to the top 185 of the flight, where they are transferred to a truck 170 moving in an adjacent row between vines; the raisin grapes are disposed in the proper position upon the paper laid by the roll L and left there to dry.

Protection to the cutter 110 is afforded by the swivel mounting 121 that swings when the stake 30 is struck and accumulator cylinder 123, which restores the cutter 110 to its laterally extending position after the stake 30 has been passed.

Alternatively, the retraction device shown in Figs. 12 and 13 may be used with the hydraulic sensing unit 150 actuating an electrical circuit to pull back the cutter bar 110, a time-delay holding it retracted until the stake 30 has been passed. A more simple type of protection may be afforded to a shield 220 which may be affixed to the machine as shown in Figs. 1 and 2, in order to aid in gathering the clusters G onto the belt 162. The forward end 221 of the shield 220 may be curved and the shield mounted on hinges 222 with a stop mechanism keeping it from falling out beyond the position shown in Fig. 1 but permitting it to swing inwardly (clockwise) should an obstruction be struck. The front end 221 may carry a bumper bar 223, as shown in Fig. 2.

In some instances the grape trellis F may be at a higher level than the minimum for which the device is normally built and the cutter 110 will then have to be lifted to a normally higher level while the depressor D is also raised to a higher level than normal. The depressor D, as heretofore indicated, is raised by rotating its frame 90 about the frame member 52 so that the offset frame member 92, to which the pipe 91 is pivoted, is elevated. The cutter 110 is preferably raised by inserting a cylindrical spacer member 225 (see Fig. 3) between the support member 131 and the hydraulic motor 112. A spacer member 225 of any desired size may be used in this manner to raise the position.

Figure 19:
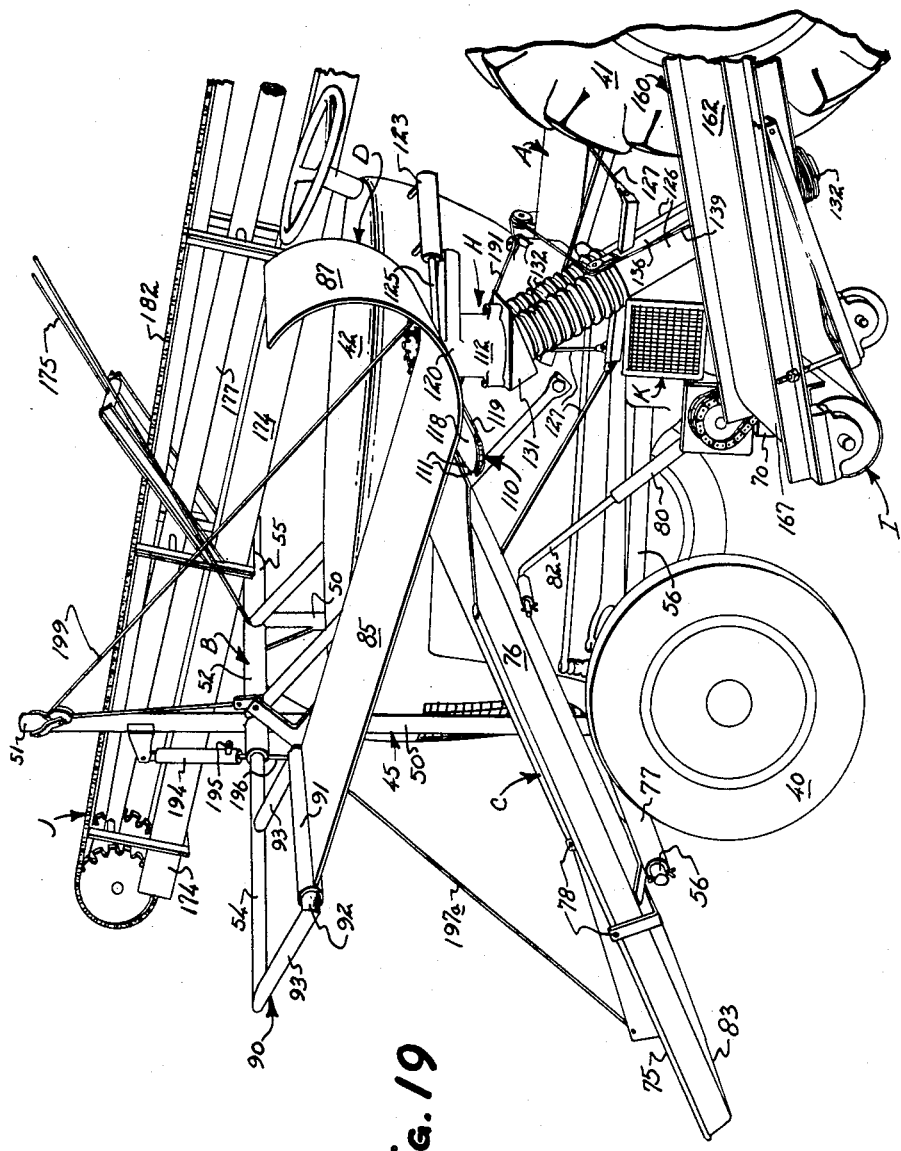
Fig. 19 is a view in perspective of the machine with some parts removed, the elevator being shown in its nonoperative transporting position with the depressor lowered and cutter raised.

Attention is called to Figs. 19, 20 and 21, where some elements have been removed, to accentuate the relationships of some of the parts. Thus Figs. 19 and 20 show the relation of the depressor D to the cutter H in both their normally closed positions (Fig. 19) when they are separated only by the trellis wire 38, when that is present, and in the open position (Fig. 20) used for entering a row of grape vines. Similarly, Fig. 21 shows the relation in position between the blower K, the conveyer I, and the cutter H, as well as the relation between the cutter H, the depressor D, and the upper end of the chute C. It will be noted that the cutter assembly H shown in these views utilizes a counterweight (not shown in these views because it is on the other side of the tractor H) as the counterbalancing mechanism. The cutter head 110 is the swivel-mounted one, not the retractable one, and the tubes 126 support the member 130 by ball bushings.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for mechanically harvesting vine-borne fruit clusters from vines trained in a vineyard in rows over horizontal wire trellises so that the fruit clusters hang down below said wires while non-fruiting shoots extend out beyond the trellises and hang down toward the ground, comprising the successive and continuously performed steps of: lifting said non-fruiting shoots to an elevated position; cutting off the clusters along a line closely below the wires and below said elevated position while simultaneously depressing the vines from above the trellis and substantially directly above the cutting point; conveying the cut clusters away as soon as they drop from the vine and moving them laterally out beyond the lifted shoots; and dropping the shoots after the cut clusters have been conveyed beyond them, said operations of lifting, cutting, depressing, conveying, and dropping being carried out substantially continuously on a movable conveyance which substantially continuously advances through said vineyard.

2. A method for mechanically harvesting vine-borne fruit clusters from vines trained in rows over horizontal wire trellises so that the fruit clusters hang down below said wires while non-fruiting shoots extend out beyond the trellises and hang down toward the ground, comprising the successive and continuously performed steps of: lifting said shoots to an elevated position; cutting off the clusters at a point closely below the wires and below said elevated position while simultaneously depressing the vines from above the trellis and substantially directly above the cutting point and while lifting said shoots over the cutting level; conveying the cut clusters away as they drop from the vine and moving them laterally out beyond the lifted shoots while blowing away loose particles; and dropping the shoots after the cut clusters have been conveyed beyond them, said lifting, cutting, depressing, conveying, blowing, and dropping being carried out substantially continuously on a movable conveyance which substantially continuously advances along said rows.

3. A method for mechanically harvesting vine-borne fruit clusters from vines trained over horizontal wire trellises so that the fruit clusters hang down below the wires, comprising simultaneously depressing the vine above said wires to lower said clusters into a severing area while cutting the clusters off at said severing area substantially directly below the point being depressed, said severing area being generally planar and lying closely adjacent and below said wires.

4. A method for mechanically harvesting vine-borne fruit clusters from vines trained over horizontal wire trellises so that the fruit clusters hang down below the wires comprising continuously depressing the vine along a moving line above said wires to lower said clusters while continuously cutting the clusters off below said wires and substantially directly below the moving line being depressed.

5. A method for mechanically harvesting vine-borne fruit clusters by and upon a movable conveyance which advances along a row of vines trained over horizontal wire trellises so that the fruit clusters hang down below said wires, comprising the steps of continuously cutting off the clusters at a point closely below the wires while simultaneously depressing the vines from above the trellis and substantially directly above the cutting point, and conveying the cut clusters away as they drop from the vine and moving them laterally out beyond the vine's lifted shoots while separating loose particles from the clusters.

6. A method for mechanically harvesting vine-borne fruit clusters from vines trained in rows over horizontal wire trellises so that the fruit clusters hang down below said wires while non-fruiting shoots extend out beyond the trellises and hang down toward the ground, comprising advancing a movable conveyance along each row while it successively and continuously performs the steps of: lifting said shoots to an elevated position and retaining them there; cutting off the clusters at a point closely below the wires and below said elevated position while simultaneously depressing the vines from above the trellis and substantially directly above the cutting point; conveying the cut clusters away as they drop from the vine and moving them laterally out beyond the lifted shoots while blowing away loose particles; dropping the shoots after the cut clusters have been conveyed beyond them; elevating the cut clusters while conveying them laterally over the adjacent row of vines; and depositing them at a desired location beyond the adjacent row of vines.

7. A method for mechanically harvesting vine-borne fruit clusters from vines trained in rows over horizontal wire trellises so that the fruit clusters hang down below said wires while non-fruiting shoots extend out beyond the trellises and hang down toward the ground, comprising the successive and continuously performed steps of: lifting said shoots to an elevated position and retaining them there; cutting off the clusters at a point closely below the wires and below said elevated position while simultaneously depressing the vines from above the trellis and substantially directly above the cutting point; conveying the cut clusters away as they drop from the vine and moving them laterally out beyond the lifted shoots while blowing away loose particles; dropping the shoots after the cut clusters have been conveyed beyond them; laying down a strip of paper on the ground between rows of vines; and depositing the cut clusters thereon for sun drying, said lifting, cutting, depressing, conveying, dropping, laying, and depositing being carried out substantially continuously on a movable conveyance which substantially continuously advances through said vineyard.

8. A method for mechanically harvesting vine-borne fruit clusters by a conveyance moving along a row of vines trained over horizontal wire trellises so that the fruit clusters hang down below said wires while non-fruiting shoots extend out beyond the trellises and hang down toward the ground, comprising the successive and continuously performed steps of: cutting off the clusters at a point closely below the wires while simultaneously depressing the vines from above the trellis and substantially directly above the cutting point; and conveying the cut clusters away as they drop from the vine at a speed balancing the forward speed of cutting and moving them beyond the vines.

9. A method for harvesting vine-borne fruit clusters from vines trained in rows along and above horizontal wire trellises wherein the fruit clusters hang down below said wires while non-fruiting shoots extend out beyond the trellises and hang down toward the ground, said harvesting being done by a single movable conveyance which advances along said rows; comprising the successive and continuously performed steps of: lifting said non-fruiting shoots to an elevated position above said wires; cutting off the portions of the vine that extend below the wires while simultaneously depressing the fruiting shoots from above the trellis and substantially directly above the cutting point; conveying the cut clusters away as they drop from the vine and moving them laterally out beyond the lifted shoots; and dropping the shoots after the cut clusters have been conveyed beyond them.

10. A method for harvesting vine-borne fruit clusters from vines trained in rows with fruiting shoots growing over horizontal wire trellises with the fruit clusters hanging down while non-fruiting shoots extend out beyond the trellises and hang down toward the ground, said harvesting being done by a single movable conveyance moving along said rows; comprising the successive and continuously performed steps of: lifting said non-fruiting shoots to an elevated position above said wires; cutting the vines off just below the wires while simultaneously depressing the fruiting shoots from above the trellis and substantially directly above the cutting point; conveying the cut clusters away as they drop from the vine and moving them laterally out beyond the lifted shoots while blowing away lose particles and cut-off portions of the vine other than the cut clusters; and dropping said non-fruiting shoots after the cut clusters have been conveyed beyond them.

11. A method for harvesting vine-borne fruit clusters by a single conveyance advancing along rows of vines trained over horizontal wire trellises so that the fruit clusters hang down below the wires, comprising simultaneously depressing the vine above said wires to lower said clusters while cutting said vine just below said wire and substantially directly below the point being depressed.

12. A method for harvesting vine-borne fruit clusters from vines trained in rows over horizontal wire trellises so that the fruit clusters hang down below said wires, comprising the steps of cutting off everything lying below the wires along a strip of each row, while simultaneously depressing the vines from above the trellis and substantially directly above the cutting point, and conveying the cut clusters away as they drop from the vine and moving them laterally out beyond the vine's lifted shoots while separating leaves and other loose particles from the clusters.

13. The method of claim 12 wherein said separating step is accomplished by directing a flow of air through the cut clusters as they drop and are conveyed away.

14. A method for mechanically harvesting and placing for sun-drying vine-borne fruit clusters by and on a movable conveyance which advances along a row of vines trained over horizontal wire trellises so that the fruit clusters hang down below said wires, comprising the successive and continuously performed steps of: cutting off the clusters along a moving line closely below the wires and below said elevated position while simultaneously depressing the vines from above the trellis and substantially directly above the cutting point; conveying the cut clusters away as they drop from the vine and moving them laterally out beyond the lifted shoots, while laying down a strip of paper on the ground between rows of vines; and depositing the cut clusters on said paper for sun drying in the order and spacing as cut.

15. The method of claim 14 wherein said conveying step is carried on at a speed balancing the advancing of said vehicle and the forward speed of cutting and wherein said depositing step is carried on directly from said conveying step and at approximately the same speed.

References Cited in the file of this patent

UNITED STATES PATENTS

| Number | Name | Date |
|---|---|---|
| 460,903 | Woodward | Oct. 6, 1891 |
| 716,440 | Larson | Dec. 23, 1902 |
| 1,101,331 | Reinoehl | June 23, 1914 |
| 1,639,055 | Patterson | Aug. 16, 1927 |
| 2,592,270 | Getz | Apr. 8, 1952 |
| 2,685,773 | Dauenhauer | Aug. 10, 1954 |
| 2,740,233 | Reynolds | Apr. 3, 1956 |
| 2,748,535 | Skromme et al. | June 5, 1956 |
| 2,763,114 | Carruthers | Sept. 18, 1956 |
| 2,790,290 | Tufford | Apr. 30, 1957 |
| 2,799,984 | La Rose et al. | July 23, 1957 |

FOREIGN PATENTS

| Number | Country | Date |
|---|---|---|
| 42,249 | Mexico | June 3, 1943 |
| 42,250 | Mexico | June 3, 1943 |